UNITED STATES PATENT OFFICE.

CHARLES E. AVERY, OF BOSTON, MASSACHUSETTS, ASSIGNOR TO LUCINDA M. AVERY, OF SAME PLACE.

BAKING-POWDER.

SPECIFICATION forming part of Letters Patent No. 235,615, dated December 21, 1880.

Application filed August 9, 1880. (Specimens.)

*To all whom it may concern:*

Be it known that I, CHARLES E. AVERY, of Boston, in the county of Suffolk and State of Massachusetts, have invented a new and useful Improvement in the Art of Raising Bread, which improvement is described in the following specification.

This invention relates to the raising of bread by the reaction of the acid lactate of calcium on the alkaline carbonates or bicarbonates before the dough has become hardened or set by the heat of the oven.

To carry this improvement into effect the acid lactate of calcium and the alkaline bicarbonate may be previously mixed together and added in suitable quantity to the flour, or they may be separately mixed with the flour when required.

If the mixture of acid lactate and alkaline carbonate is to be kept for some time before using, it is proper to mix dry and powdered starch with it to prevent change and loss of strength. If the acid lactate of calcium is itself dehydrated and deprived of water of crystallization, the change is also retarded.

The mixture of the bicarbonate and acid lactate with the flour or starch may be effected by sifting them with the flour, by trituration, or any of the ordinary methods for mixing powders.

That the acid lactate of calcium may be suitable for raising bread, as described hereinafter, it is not necessary that it should be entirely free from neutral lactate of calcium or from free lactic acid, nor is it detrimental if it contains small quantities of butyric acid or butyrates. It may be produced more cheaply and easily and be equally suitable for raising bread when some impurities are allowed to remain.

To make the bread I prefer the following proportions, but do not confine myself strictly to them: I mix the acid lactate with the flour, about forty parts, by weight, of dry pulverized lactate with twenty-five hundred parts, by weight, of flour, and then add sixteen parts, by weight, of bicarbonate of soda, if that salt is used; nineteen parts, by weight, if bicarbonate of potash is used; fifteen parts, by weight, if bicarbonate of ammonia is used. If the carbonates are used instead of the bicarbonates, I mix eighty parts, by weight, of dry pulverized acid lactate with twenty-five hundred parts, by weight, of the flour, and add twenty parts, by weight, if carbonate of soda is used, or twenty-six parts, by weight, if carbonate of potash is used, or eighteen parts, by weight, if carbonate of ammonia is used. I prefer the alkaline bicarbonates to the alkaline carbonates for the purpose of raising bread, as less lactate is required. The mixture of flour, acid lactate, and alkaline carbonate or bicarbonate is then salted, if desired, about five to fifteen parts, by weight, to one thousand parts, by weight, of flour, and mixed with five hundred parts, by weight, of water, (more or less,) as the baker desires, well kneaded, molded, and baked.

The described process is useful for the following reasons: The salts left in the bread are naturally present in the system and do not, therefore, act injuriously when taken in the food. The taste of the lactates left in the bread is mild and does not cover and disguise the natural flavor of the grain.

If, from accident, an excess of alkaline carbonate is mixed in the bread, the alkaline taste and color are less perceptible than with cream of tartar, for after the acid lactate is converted into neutral lactate by reaction with the alkaline carbonate the neutral lactate of calcium still reacts on the alkaline carbonate, forming carbonate of calcium and lactate of the alkali, both neutral to the taste and not discoloring the bread. If the alkaline salts are bicarbonates, the neutral lactate of calcium formed reacts on them if they are in excess, forming carbonate of calcium, lactate of the alkali, and free carbonic-acid gas, to aid in raising the bread.

Although the acid lactate is itself easily changed by heat into bitter compounds, these bitter dilactic salts do not form in perceptible quantity in the bread, nor does the ready discoloration that the lactates of calcium undergo by heat discolor the bread.

The carbonic-acid gas is evolved to raise the bread at the proper time, not so soon as to escape leaving it unraised, nor so late as to fail of its purpose. The reaction is so complete that the alkali is neutralized, and not left free to injure the bread.

The bilactate of calcium can be readily and cheaply made, so as to drive from the market by reason of price alone the injurious substances now used.

I claim—

1. The improved baking-powder or cream-of-tartar substitute herein described, consisting of an acid lactate with an alkaline carbonate or bicarbonate, as set forth.

2. A bread-raising composition composed of acid lactate of calcium and an alkaline bicarbonate or carbonate, substantially as specified.

CHARLES E. AVERY.

Witnesses:
GOODWIN PALMER,
WILLIAM L. THOMPSON.